April 18, 1950     A. FISCHER-SCHMUTZ     2,504,673
JOINTING AND GLUING MACHINE

Filed Nov. 9, 1945     2 Sheets-Sheet 1

Inventor
Adolf Fischer-Schmutz
By Glascock Downing Seckla Attys.

April 18, 1950     A. FISCHER-SCHMUTZ     2,504,673
JOINTING AND GLUING MACHINE
Filed Nov. 9, 1945     2 Sheets-Sheet 2
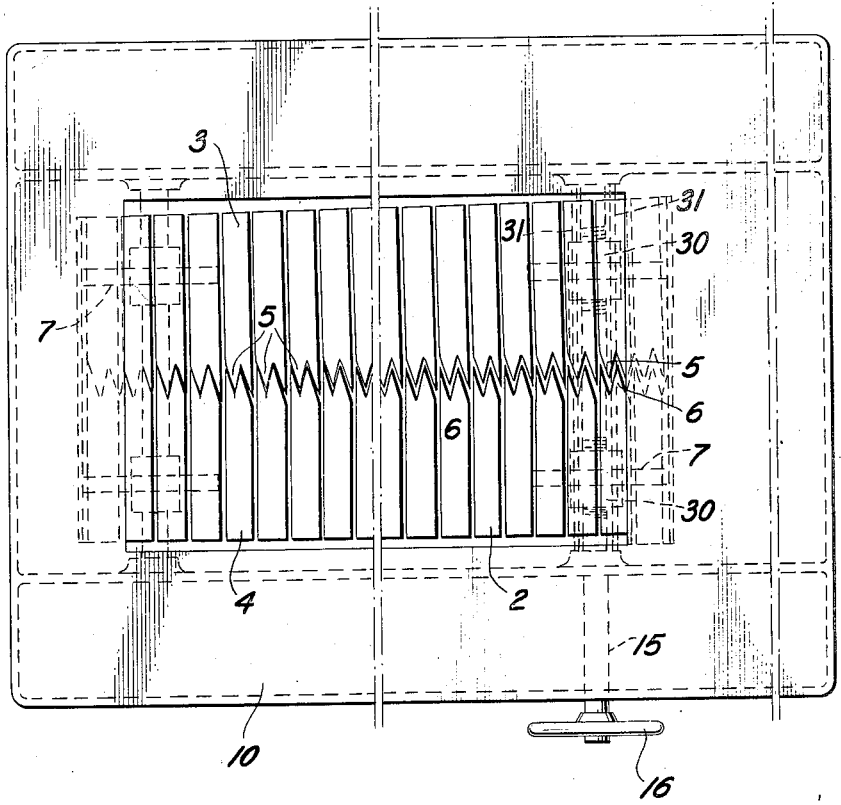
INVENTOR
ADOLF FISCHER-SCHMUTZ
BY
Attorneys Patented Apr. 18, 1950

2,504,673

UNITED STATES PATENT OFFICE 2,504,673

JOINTING AND GLUING MACHINE

Adolf Fischer-Schmutz, Basel, Switzerland

Application November 9, 1945, Serial No. 627,568
In Switzerland June 6, 1944

Section 1, Public Law 690, August 8, 1946
Patent expires June 6, 1964

3 Claims. (Cl. 144—279)

Object of the invention is a machine for jointing and gluing together the edges of flat material, e. g. of veneers, in feed direction.

In known machines of this kind, the edges to be glued together are pressed against each other by rollers, the plane of rotation of which is inclined with regard to the feed direction. This inclination can be adjusted. These machines have great disadvantages. The rollers transmit pressure upon the material only along a line. There are thus as many linear pressure places as there are rollers. Between these linear pressure places, the flat material is unloaded and can rise into waves, so that the edges, on these wavy places, are not accurately brought together. Beside this, sliding between the rollers and the flat material occurs owing to the fact that the rollers do not advance in feed direction, but rotate on the spot. This sliding injures the gluing process.

Another disadvantage of these known machines is, that the material to be treated moves on stationary heating bodies, which causes considerable friction.

According to the invention, all the above-mentioned inconveniences are remedied in that no rollers rotating on the spot are used, but conveying means lying opposite to one another and advancing together with the flat material; at least one of these conveying means is subdivided into two partial means, adjacent edges of which fit into each other. By preference, bands, e. g. chain bands are used as conveying means. The two above-mentioned parts of one of the conveying means approach each other in feed direction forming thereby an acute angle between them, whereby the edges of the flat material are pressed against one another uniformly over their whole length. Since the pressure necessary between the edges depends on the thickness of the material, it must be adjustable; for this purpose a device for changing the acute angle at will is provided.

In that the two parts of at least one conveying means fit into each other, any turning aside of the flat material from the conveying plane, caused by the pressure exerted, is impossible. As no friction occurs, the pressure exerted can be chosen as great as desired, without braking the feed movement.

In known machines, on the stationary heating and pressure elements, a crust of glue is formed at the jointing place, since gluing together takes always place along the same line. This crust can become so hard and thick, that the gluing process is injured and that the adjacent moving parts are damaged. Owing to the fact that, according to the invention, movable conveying means are provided above and below the flat material, it is possible to remove the glue adhering to them by cleaning means after each passage. A continuously increasing glue deposition, as it occurs in known machines, is thus avoided.

The accompanying drawings illustrate, by way of example, one embodiment of the jointing and gluing machine according to the invention.

Fig. 3 is a plan view of the lower band.

Figure 1:
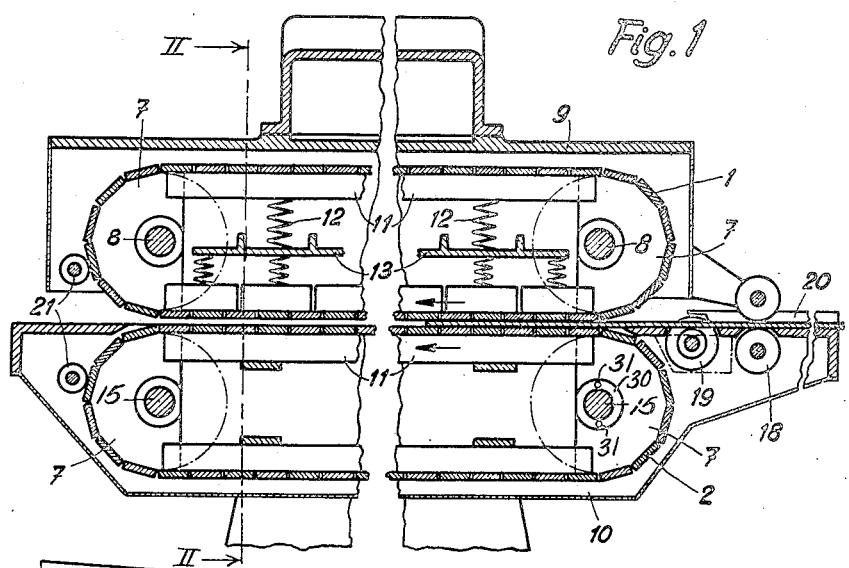
Fig. 1 is a longitudinal section through this machine.

The upper and lower conveying means are formed as conveying chains or bands 1 and 2. The lower band is subdivided into two partial bands 3 and 4, the adjacent edges of which fit into each other. These edges may have any shape whatever. In Fig. 3 the edges have teeth of triangular form. The edges might even be wave-formed. The partial bands 3 and 4 converge toward one another from the supply end (on the right in Fig. 1) to the delivery end (on the left in Fig. 1) so as to form an acute angle between them (Fig. 3). Owing to this converging, the edges of the flat material to be glued together are pressed towards each other over the whole working length of the conveying bands. Both, the upper and lower conveying band runs over wheels 7 mounted on shafts 8 rotatably carried by bearings. Each of the bands 1 and 2 is driven by a non-illustrated motor through one of their shafts 8. It might, however, be convenient to drive only one of the bands while the other is taken along merely by friction. Both partial bands 3 and 4 of the lower conveying band 2 and the upper conveying band 1 are guided by rails 11 fixed to the frames 9 and 10. On gluing, a certain pressure must be exerted perpendicularly to the flat material. This is carried out by springs 12 which, within the upper conveying band, bear against the rails 11 and against a support 13 of the frame 9. In reach of the jointing place, that is, of the edges fitting into each other, heaters 14 are provided in order to heat this place to a degree suitable for the gluing process.

Since the pressure, under which the edges to be glued together are to be pressed towards each other, must be adapted to the thickness of the flat material, an adjusting mechanism is provided for varying the converging angle between the partial bands, that is, the acute angle between the adjacent edges of these partial bands.

Figure 2:
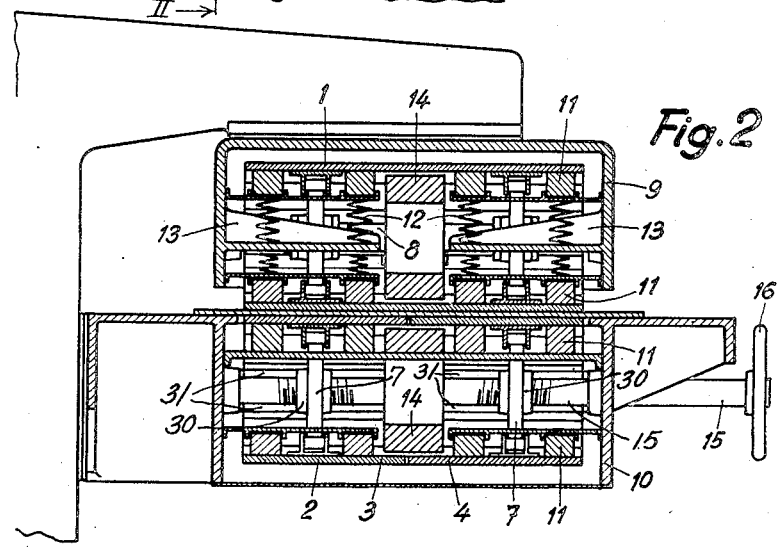
Fig. 2 is a cross section along the line II—II in Fig. 1.

For this purpose, the wheels 7 of the lower band, lying at the feed end are loosely mounted on two axially slidable sleeves 30 slidable on rods 31 mounted in the frame 10 (Fig. 2). The combination of the sleeves 30 and rods 31 is a well-known expedient for mounting slidable, non-rotatable members, as shown for instance in U. S. Patent Number 1,239,620. One of these sleeves has right-, the other left-hand thread. These two threads engage corresponding threads of the left- and right-hand spindle 15 which can be rotated by a hand-wheel 16 in one or another direction, so that the lower wheels 7, lying at the feed end, are either approached to or removed from each other, varying in this way the converging angle between the partial bands. Since the two partial bands 3 and 4, as above described, must on adjustment of the converging angle be moved towards or away from each other, sufficient play must be provided between the portions 5 and 6 fitting into one another, so that mutual displacement becomes possible. As shown in Fig. 1, the machine, at its feed end, has feeding rollers 18, a glue-applying roller 19 and a guide bar 20 keeping the veneers or other strips to be inserted separated from one another until they come into contact with the roller 19.

At the outlet end (on the left in Fig. 1) brush rollers 21 are provided, which are in contact with the conveying bands in order to remove the glue remaining on these bands after each passage, and to prevent in this way a continuously increasing deposition of glue.

With the machine described, work is done as follows: The veneers or other strips are inserted at the feed end, drawn in by the feed roller 18, supplied with glue by the roller 19 and then seized by the conveying bands 1 and 2. Owing to the acute angle under which the partial bands 3 and 4 of the lower band 2 lie with regard to each other and which has previously been adapted to the thickness of the strips to be glued together by turning the hand wheel 16, the edges of the strips are pressed together uniformly over their whole length. Owing to the partial bands 3 and 4 fitting into each other, the strips can never rise into waves. Furthermore, since the machine parts in contact with the strips move at the same speed as the strips themselves, no friction hampering the advance movement occurs between these parts and the strips. Therefrom it follows, that the pressure can be given a value most favourable for the gluing process, even if the pressure be very great. The machine illustrated can undergo very different modifications without a departure from the spirit of the invention. The brush rollers 21 may, for instance, be replaced by stripping plates or the like. In the drawings a heating device is shown by which the heat is transmitted by radiation to the conveying bands; however, a heating means could be provided transmitting heat to the bands by contact. In the drawings, only the lower conveying band is subdivided into two partial bands, while the upper band is made in one piece over its whole width. The contrary may, of course, be the case or both bands may consist of two partial bands.

What I claim is:

1. In a machine for jointing and gluing together the edges of flat material by longitudinal movement of this flat material, a feed mechanism, including feed bands lying opposite one another and adapted to carry along the flat material between them, one of said bands being divided in longitudinal direction into two partial bands lying side by side with their adjacent edges fitting into each other and converging toward one another from the supply end to the delivery end of the machine.

2. In a machine for jointing and gluing together the edges of flat material by longitudinal movement of this flat material, a feed mechanism, including feed bands lying opposite one another and adapted to carry along the flat material between them, one of said bands being divided in longitudinal direction into two partial bands lying side by side with their adjacent edges fitting into each other and converging toward one another from the supply end to the delivery end of the machine, and an adjusting mechanism in operating relation with said partial bands for adjustment of the converging angle between them.

3. In a machine for jointing and gluing together the edges of flat material by longitudinal movement of this flat material, a feed mechanism, including feed bands lying opposite one another and adapted to carry along the flat material between them, one of said bands being divided in longitudinal direction into two partial bands lying side by side with their adjacent edges fitting into each other and converging toward one another from the supply end to the delivery end of the machine, a right- and left-hand threaded spindle, and wheels mounted on said spindle and in engagement with said partial bands to adjust the converging angle between said partial bands by rotation of said spindle.

ADOLF FISCHER-SCHMUTZ.

REFERENCES CITED

The following references are of record in the file of this patent:

UNITED STATES PATENTS

| Number | Name | Date |
| --- | --- | --- |
| 1,643,194 | Black | Sept. 20, 1927 |
| 2,305,525 | Gustin | Dec. 15, 1942 |
| 2,351,946 | Friz | June 20, 1944 |
| 2,373,376 | Bolling | Apr. 10, 1945 |
| 2,398,353 | Bolling | Apr. 16, 1946 |